Patented July 25, 1933

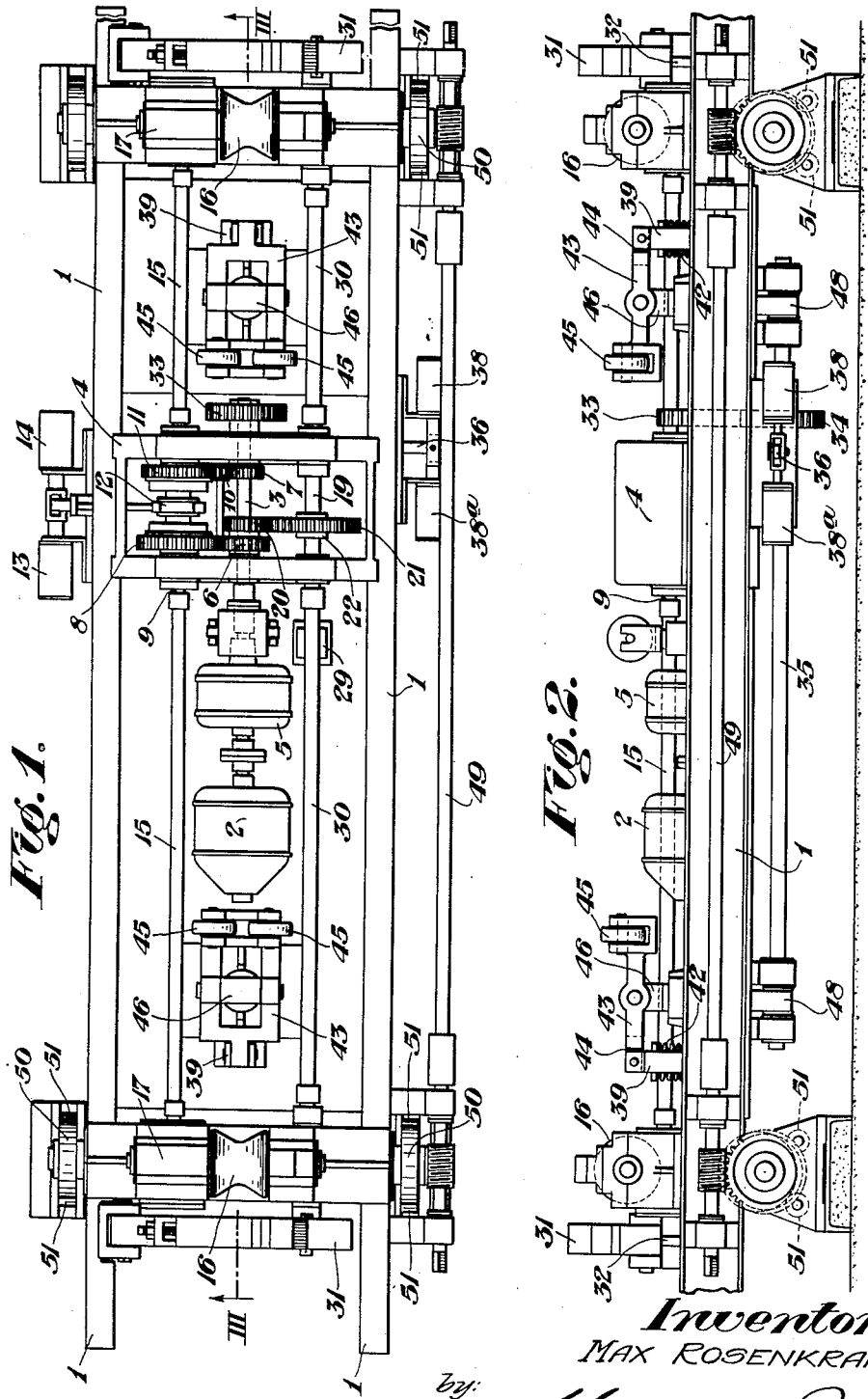

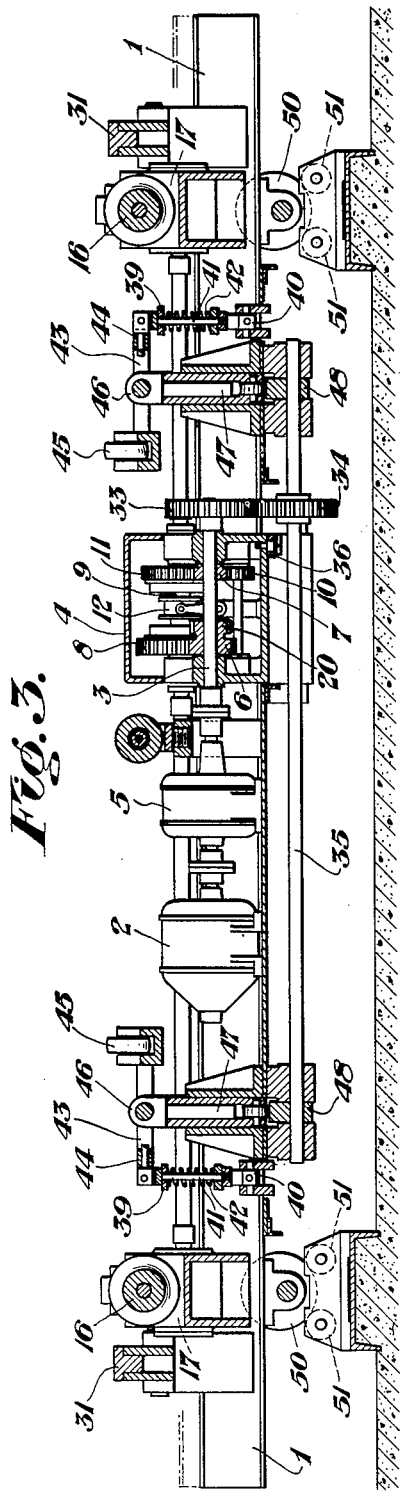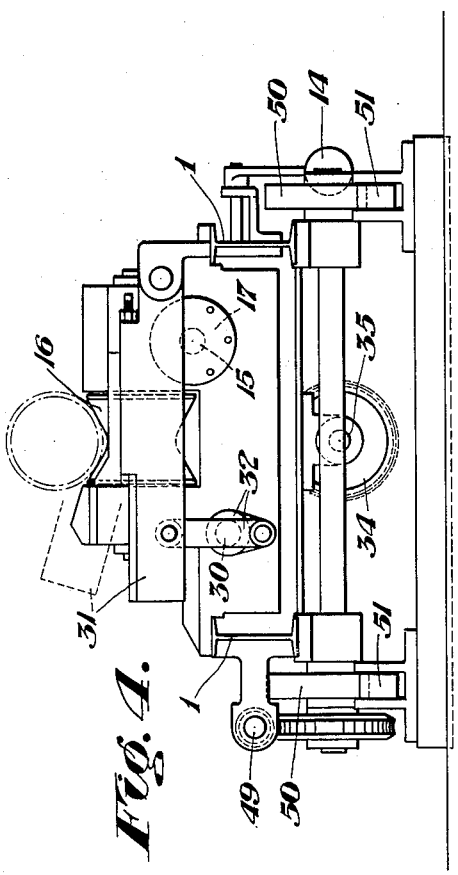

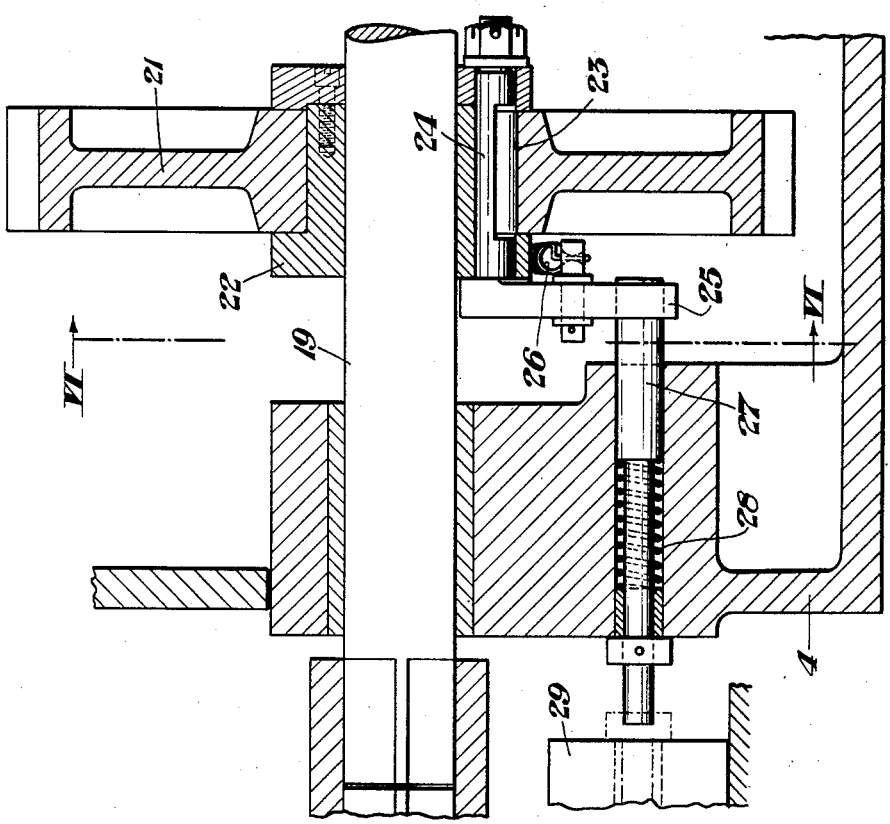
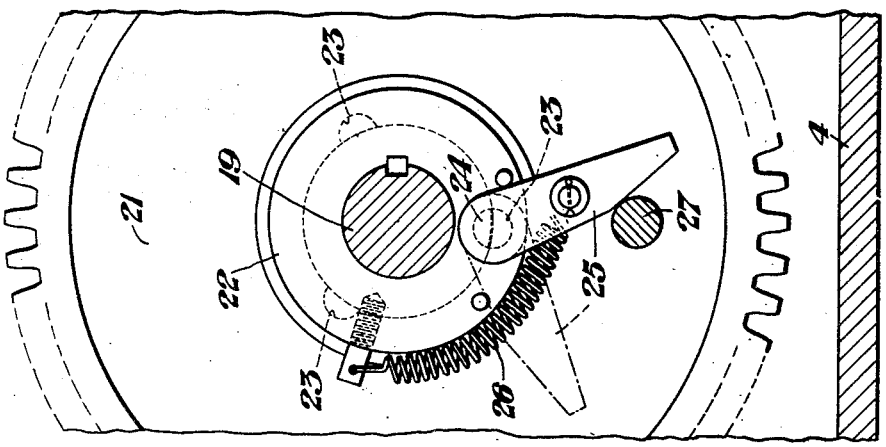

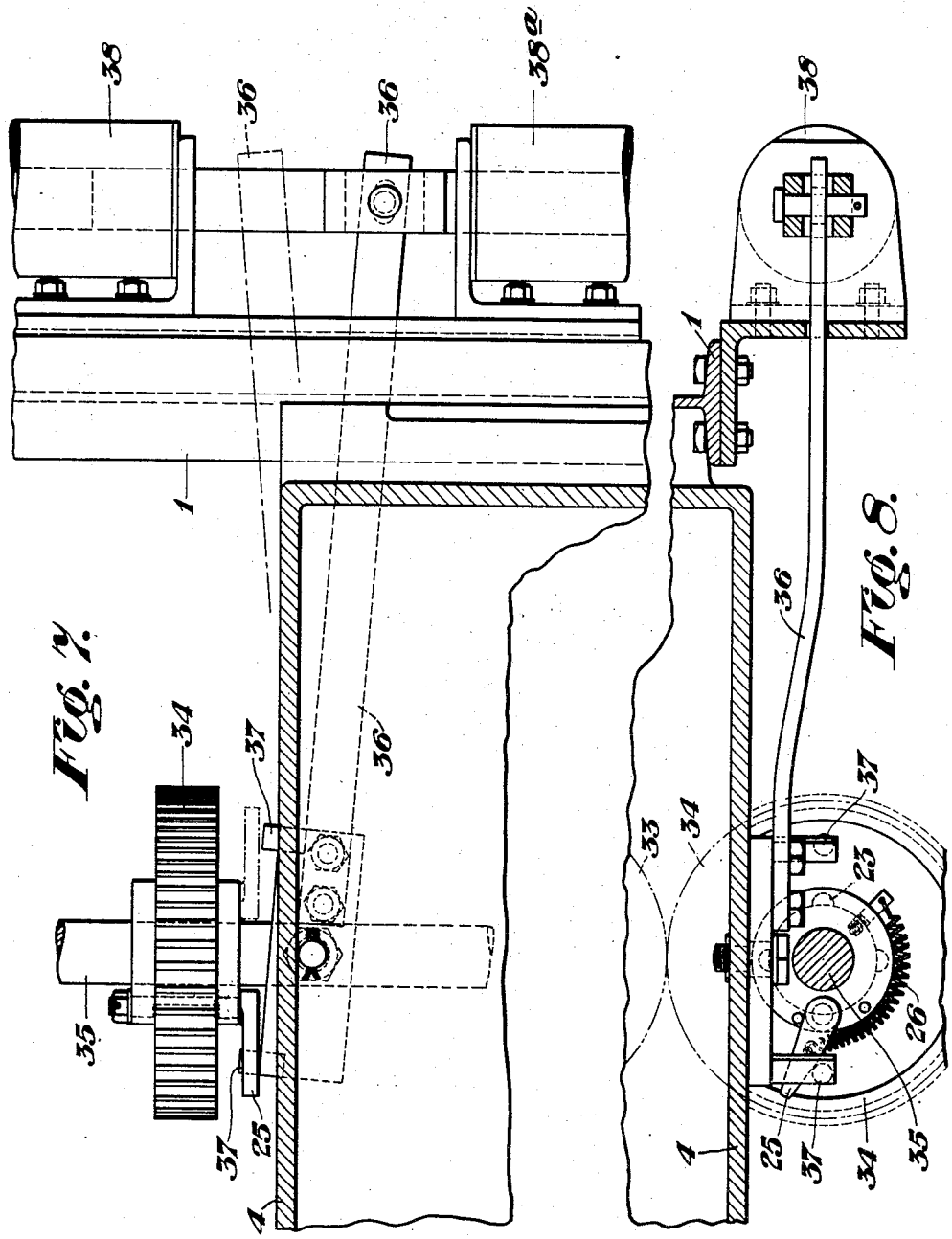

1,919,394

UNITED STATES PATENT OFFICE

MAX ROSENKRANZ, OF BETHEL TOWNSHIP, PENNSYLVANIA, ASSIGNOR TO NATIONAL TUBE COMPANY, A CORPORATION OF NEW JERSEY

PIPE TABLE

Application filed April 11, 1932. Serial No. 604,597.

This invention relates to pipe tables, one of the objects being to provide a machine which will feed pipes back and forth longitudinally, which will provide for their rotation and which will discharge them. Another object is to handle a pipe in the aforementioned manner without the use of a number of independent fluid motors or apparatus which must be separately adjusted. Other objects will be understood from the following.

Having reference to the accompanying drawings which illustrate a specific form of the invention particularly adapted for use in conjunction with a pipe threading machine:

Figure 1 is a top plan.

Figure 2 is a side elevation.

Figure 3 is a cross-section from the line III—III of Figure 1.

Figure 4 is an end elevation.

Figure 5 is a vertical cross-section of a detail from Figure 1,

Figure 6 is an end elevation of the detail shown in Figure 5.

Figure 7 is a sectional plan showing details in the construction of the pipe tables.

Figure 8 is a sectional side elevation of the details shown in Figure 7.

These drawings show an elongated frame 1 on which is mounted an electric motor 2 which drives the central power shaft 3 of a gear-box 4 through reduction gearing 5. Pinions 6 and 7 are mounted on the shaft 3, the pinion 6 being directly meshed with a gear 8 mounted on a side shaft 9 and the pinion 7 being meshed with an idler gear 10 which in turn is meshed with a gear 11 also carried on the shaft 9. Both gears 8 and 11 idle on the shaft 9 and may selectively drive the same through a conventional clutch mechanism 12 which is electromagnetically operated by solenoids 13 and 14.

The shaft 9 has squared ends which are engaged by a pair of tubular shafts 15 which drive pipe conveying rollers 16 through right angular gearing 17. These conveying rollers have V-shaped surfaces for carrying a pipe. Operation of one or the other of the solenoids 13 and 14 will cause the rollers 16 to rotate in either a forward or reverse direction.

A second side shaft 19 is driven by the power shaft 3 through a pinion 20 and gear 21. This gear 21 is fixed to the shaft 19 on a hub 22 which is keyed to the latter. The gear and hub may freely rotate with respect to each other, and the former has a plurality of indentations 23 while a half-round pin 24 is fixed to the hub 22, which may be turned into engagement with the indentations 24 in the gear 21 by a finger 25 urged by a spring 26. This the finger is normally prevented from doing by a pin 27 which is urged into finger-engaging position by a spring 28, a solenoid 29 being arranged to pull the pin 27 out of this position momentarily so that the finger is allowed to turn the pin 24 to place the gear 21 in driving connection with the shaft 19. The shaft 19 makes only one rotation because the finger 25 will again be engaged by the pin 27.

The shaft 19 has squared ends which are connected to tubular shafts 30 extending along the frame 1. Pipe throw-off arms 31 are pivoted at each end of the frame 1 adjacent the feed rollers 16 so that when these arms are swung upwardly a pipe on these feed rollers will be discharged from the machine. This motion is accomplished by crank and arm connections 32 which are arranged between the free ends of the arms 31 and the ends of the shafts 30. When these shafts are given a rotation by the means described, the arms 31 will be swung upwardly to pipe-discharging position and then back to their normal rest position.

The power shaft 3 extends through the gear-box 4 and carries a gear 33 on its outer end. This gear is meshed with another gear 34 which may be placed in connection with a shaft 35 through a clutching arrangement similar to the one already described in connection with the gear 21. In this instance, however, a lever 36 is pivoted on a bracket fixed to the gear-box 4 near the gear 34 and the finger on this gear which controls its clutching operation is engaged by a pair of pins 37 opposingly carried on the lever 36 so that when one is moved out of engagement with the finger of the gear 34 the other one will be moved forward and engage this finger after the shaft 35 has made half a rotation. The lever 36 is operated by a pair of solenoids 38 and 38ª which may be energized to swing the shaft back and forth. This shaft 35 operates a pair of jack rollers which are arranged to lift a pipe off the rollers 16, so that it may be rotated.

These jack rollers each consist of a normally vertical yoke 39 mounted on the frame 1 by a universal joint 40. The closed end of this yoke has a hole down through which a rod 41 passes. This rod has a spring 42 compressed between its end and the closed part of the yoke 39. A normally horizontal yoke 43 is fixed to the top of the rod 41 by a universal joint 44 and carries a pair of rollers 45 on its ends, which are arranged to permit rotation of a pipe lifted by them. The yoke 43 has a cross-head 46 arranged midway between its joint end and the rollers 45, which is connected to a plunger 47 which extends downwardly towards the shaft 35. The plunger 47 can rotate as well as reciprocate and the various universal joints coupled with the action of the spring 42 provides a floating action for the rollers 45. The shaft 35 carries cams 48 which engage the push-rods 47 so that when the shaft 35 is given a half rotation as described the jack rollers will lift a pipe carried by the feed rollers 16. When this shaft is given another half rotation the jack rollers will be lowered.

The frame 1 may be vertically adjusted by rotating a shaft 49. This shaft is geared to a pair of eccentric cams 50 which rest on rollers 51 carried on supporting pedestals. Thus when the shaft 49 is rotated the cams 50 will be turned and, due to their eccentricity, will raise or lower the frame 1.

Although a specific form of this invention has been shown and described in accordance with the patent statutes, it is not intended to limit its scope exactly thereto, except as defined by the following claims.

I claim:

1. A pipe table including a vertically adjustable frame, pipe conveying rollers on said frame, jack rollers constructed and arranged on said frame to lift a pipe off said conveying rollers and allow its rotation, and means for discharging a pipe from said conveying rollers.

2. A pipe table including a vertically adjustable frame, rollers arranged on said frame to move a pipe longitudinally, means for rotating said rollers, vertically movable rollers arranged on said frame in line with said first named rollers to permit rotary movement of a pipe when lifted thereby, means for moving said second named rollers vertically, arms arranged on said frame to discharge pipes from said first named rollers and means for swinging said arms.

3. A pipe table including a frame, a motor on said frame, a set of rotative shafts extending along said frame, means for reversibly driving said shafts by said motor, pipe conveying rollers arranged on said frame in connection with said shafts, a second set of rotative shafts extending along said frame, means for driving said second set of shafts by said motor including a clutch, arms arranged on said frame to discharge a pipe from said rollers, cranks connecting said arms to said second set of shafts, a third set of shafts arranged along said frame, means for driving said third set of shafts by said motor including a clutch, lever members pivoted to swing in line with said rollers and each having a set of rollers on its end arranged to allow rotation of a pipe when lifted thereby and means driven by said third set of shafts for swinging said lever members.

4. A pipe table including a frame pipe conveying rollers on said frame, lever members flexibly fulcrumed on said frame in line with said rollers, depending push-rods fixed to said members, cams contacting said push-rods, means for rotating said cams and rollers arranged on the ends of said levers to permit rotation of pipes lifted thereby.

5. A jack-roller for pipe conveying rollers comprising a normally vertical yoke having its ends universally mounted and with a hole in its closed end, a rod passing down through said hole with a spring compressed between its lower end and the closed end of said yoke, a normally horizontal yoke universally fixed at its closed end to the top of said rod, coacting pipe carrying rollers arranged on the ends of said horizontal yoke, a cross-head centrally fixed to said horizontal yoke, a push-rod depending from said cross-head and a cam arranged to lift said push-rod.

6. A pipe table including an elongated frame, a motor on said frame, a set of rotative shafts extending along said frame, electromagnetically operated means, for reversibly connecting said shafts to said motor, pipe conveying rollers arranged on said frame in connection with said shafts, a second set of rotative shafts extending along said frame, means for driving said second set of shafts including an electromagnetically operated clutch constructed to automatically disengage when these shafts have made a rotation, arms arranged on said frame to discharge a pipe from said rollers, crank and arm connections between said second set of shafts and said arms, a third set of shafts arranged along said frame, means for driving said third set of shafts by said motor including an electromagnetically operated clutch constructed to automatically disengage when these shafts make a half rotation, lever members pivoted to swing upwardly in line with said conveying rollers and each having a pair of rollers on its end arranged to allow rotation of a pipe when lifted thereby, push-rods depending from said lever members, and cams fixed to said third set of shafts and engaging said push-rods.

MAX ROSENKRANZ.